Patented Aug. 3, 1937

2,088,633

UNITED STATES PATENT OFFICE 2,088,633

PROCESS FOR PREPARING HYDROAROMATIC LACTONES

Euclid W. Bousquet, Wilmington, and Wilbur A. Lazier, New Castle County, Del., assignors to E. I. du Pont de Nemours & Company, Wilmington, Del., a corporation of Delaware No Drawing. Application March 30, 1935, Serial No. 13,930

14 Claims. (Cl. 260—123)

This invention relates to catalytic hydrogenation processes and more particularly to processes for the catalytic preparation of hydroaromatic lactones. Specifically it relates to the preparation of hexahydrophthalide.

The use of aerated platinum black catalysts for the reduction of phthalide has been described by Willstätter and Jaquet (Ber. 51, 767 (1918), but these authors obtained only a low yield of hexahydrophthalide, together with an equal amount of hexahydro-o-toluic acid. Phthalic anhydride was also used by these same authors as a source of hexahydrophthalide, but hydrogenation of the anhydride over a platinum black catalyst gave large proportions of hexahydro-o-toluic and hexahydrophthalic acids as by-products of the reaction. The susceptibility of the platinum catalyst to poisoning, which necessitated its frequent reactivation during the hydrogenation, the excessive cost of the catalyst, and the low yields of hexahydrophthalide obtained have, until now, combined to discourage the commercial utilization of the process. Reduction of phthalide by nascent hydrogen has been shown to give only a 15 per cent yield of hexahydrophthalide (Einhorn, Ann. 300, 156, 172 (1898)). To our knowledge no one has heretofore produced hexahydrophthalide in the manner described in this specification.

This invention has as an object the provision of a feasible, economical, and commercially practicable process for the production of lactones of hydroaromatic carboxylic acids. A further object is the preparation of hexahydrophthalide. Other objects will appear hereinafter.

These objects are accomplished by the following invention, wherein an inner anhydride or lactone of a hydroxymethyl aromatic carboxylic acid of the general formula:

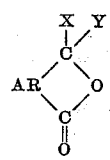

wherein AR is any aryl or substituted aryl group and X and Y are substituents selected from the group comprising alkyl or aryl groups and hydrogen, is hydrogenated to the lactone of the corresponding hydroxymethyl hydroaromatic carboxylic acid by bringing the aromatic lactone into contact with hydrogen under suitable conditions of temperature and pressure and in the presence of a suitable base metal hydrogenation catalyst, preferably nickel.

Having outlined the general objectives of the invention, the following examples show in detail how the invention may be carried out in practice. The examples are included for purposes of illustration only and are not intended as limitations.

Example I

A high pressure autoclave was charged with 800 g. of phthalide and 80 g. of a highly active nickel catalyst prepared by extracting with sodium hydroxide a finely ground nickel-aluminum alloy. Compressed hydrogen was introduced until a pressure of 1500 pounds per square inch was reached. The contents of the autoclave were heated seven hours with stirring in the temperature range of 120° to 140° C. The hydrogenated material was removed from the autoclave and diluted with benzene to facilitate filtration. The benzene solution was extracted with sodium carbonate solution to effect the removal of acids and the benzene was evaporated. Distillation of the residual material gave 690 g. of pure hexahydrophthalide, or 82.5% of the theoretical amount. The sodium carbonate solution was acidified to recover the acidic material produced in the hydrogenation. There was thus obtained 8 grams of ortho-toluic acid and 51 grams of hexahydro-ortho-toluic acid, which amounts correspond to 1% and 6% conversions, respectively.

Example II

A high pressure autoclave was charged with 20 g. of an active nickel catalyst like that used in Example I, and 200 g. of phthalide. Compressed hydrogen was introduced and the temperature was raised to 120° C. The contents of the autoclave were heated for seven hours with stirring at 120° to 150° C. with a hydrogen pressure of 1500 to 2300 pounds per square inch. Recovery and separation of the products of the hydrogenation, as described in Example I, gave 78.5% of hexahydrophthalide, 6% of recovered phthalide, and 9% of hexahydro-ortho-toluic acid.

Example III

A high pressure autoclave was charged with 17 g. of nickel-on-kieselguhr catalyst, 150 g. of phthalide, and 100 cc. of cyclohexane. Compressed hydrogen was introduced until a pressure of 1500 pounds per square inch was reached. The contents of the autoclave were heated six hours with stirring at a temperature of 200° C. Recovery and separation of the products of hydrogenation as described in Example I yielded 54.6% hexahydro-ortho-toluic acid and 31.4% of hexahydrophthalide.

While in the above examples temperatures of 120° to 150° C. and 200° C. were used, the process of the invention is operative throughout the range of 100° to 225° C. It is also readily seen from the examples given that, in general, an increase in temperature tends to favor the production of a higher proportion of hexahydro-o-toluic acid, and the temperature chosen for hydrogenation will be governed largely by the products desired. Although pressures of 1500 to 2400 pounds per square inch were used in the examples, the process is operative at pressures between 10 and 700 atmospheres.

The process may be carried out by either the batch or continuous method, the batch process being preferred. In the case of the continuous process the use of a large excess of hydrogen and a space velocity of 4 to 10 volumes of liquid per volume of catalyst per hour is recommended.

Base metal hydrogenating catalysts are suitable for the processes of this invention and include iron, copper, nickel, cobalt, tin, etc. The base metal catalysts may be used in the elementary state or in the oxide form. When using these catalysts it is preferable that they be supported on inert materials such as kieselguhr, pumice, silica gel, etc. A preferred nickel catalyst is prepared by digesting a nickel aluminum alloy with sodium hydroxide according to the method described by Raney in U. S. Patent 1,628,190. Another preferred catalyst consists of freshly reduced kieselguhr-supported nickel which has been protected from exposure to the air. It is readily seen from the examples given that the catalyst used has considerable influence on the course of the hydrogenation and the choice of the catalyst will be governed largely by the products desired.

Although the use of a solvent is described in Example III, it is usually preferable to carry out the hydrogenation in the absence of such a solvent.

In place of phthalide in the above examples, there may be used with similar results other lactones of hydroxymethyl aromatic carboxylic acids of the general formulæ:

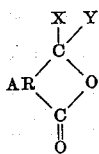

and

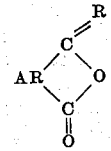

wherein AR is any ortho or peri residue of an aromatic compound, X is an alkyl or aryl group or hydrogen, and Y is an alkyl or aryl group or hydrogen which may or may not be the same as X, and R is an alkylidene group. The aryl group AR may also be further substituted, as for example there may be used other lactones such as AR-methyl, -ethyl and other AR-alkyl substituted phthalides or naphthalides, AR-methoxy, -ethoxy, and other AR-alkoxy substituted phthalides or naphthalides, or there may be used a lactone such as that of a hydroxymethyl carboxy diphenyl. As specific compounds there may be mentioned the lactone of 2-methylol-3-carboxynapthalene, the lactone of 1-methylol-8-carboxynaphthalene and the lactone of 2-methylol-2'-carboxy-diphenyl. Examples of alpha-substituted phthalides are alpha-methyl phthalide, alpha-ethyl phthalide, alpha-alpha-diethyl phthalide, and alpha-ethylidene phthalide. Any of these lactones may be hydrogenated according to the process of this invention to give the corresponding hydroaromatic lactones.

The present invention provides a new, practical, and economical method for obtaining ring hydrogenated lactones. These ring hydrogenated lactones may find use as antioxidants, parasiticides, plasticizers, and as intermediates for further synthesis.

The convenience of operation, completeness of reaction, and economy of the processes of the present invention distinguish it from any process hitherto employed in the hydrogenation of aromatic lactones. The ease of control of the hydrogenation is a distinct advantage and the completeness of the reaction can be determined readily by measuring the absorption of hydrogen.

The above description and examples are intended to be illustrative only. Any modification of or variation therefrom which conforms to the spirit of the invention is intended to be included within the scope of the claims.

We claim:
1. The process of preparing hydroaromatic lactones which comprises bringing a lactone of a hydroxymethyl aromatic carboxylic acid into contact with hydrogen in the presence of a base metal hydrogenation catalyst at a temperature between 100° and 225° C. and under a pressure above 10 atmospheres.

2. The process in accordance with claim 1, characterized in that the pressure is maintained at about 1500 to 2400 pounds per square inch.

3. The process in accordance with claim 1, characterized in that the lactone hydrogenated is phthalide.

4. The process of preparing hydroaromatic lactones which comprises bringing a lactone of a hydroxymethyl aromatic carboxylic acid into contact with hydrogen in the presence of a ferrous metal catalyst at a temperature between 100° and 225° C. and under a pressure above 10 atmospheres.

5. The process in accordance with claim 4, characterized in that the catalyst is a nickel catalyst.

6. The process in accordance with claim 4, characterized in that the catalyst is nickel supported on kieselguhr.

7. The process in accordance with claim 4, characterized in that the lactone hydrogenated is phthalide.

8. The process of preparing hexahydrophthalide which comprises bringing phthalide into contact with hydrogen in the presence of a ferrous metal catalyst under a pressure of about 1500 to 2400 pounds per square inch and at a temperature between 100° and 225° C.

9. The process in accordance with claim 8, characterized in that the catalyst is a nickel catalyst.

10. The process of preparing hexahydrophthalide which comprises bringing a solution of phthalide into contact with hydrogen in the presence of a base metal hydrogenation catalyst at a temperature between 100° and 225° C. and under a pressure above 10 atmospheres.

11. The process in accordance with claim 10, characterized in that the phthalide is dissolved in cyclohexane.

12. The process of preparing hexahydrophthalide which comprises bringing a cyclohexane solution of phthalide into contact with hydrogen in the presence of a nickel catalyst under a pressure of about 1500 to 2400 pounds per square inch and at a temperature between 100° and 225° C.

13. The process of preparing hexahydrophthalide which comprises bringing phthalide into contact with hydrogen in the presence of a nickel catalyst under a pressure of about 1500 to 2400 pounds per square inch and at a temperature of about 120° to 150° C. for about 7 hours.

14. The process of preparing hexahydrophthalide which comprises bringing a cyclohexane solution of phthalide into contact with hydrogen in the presence of a nickel-supported-on-kieselguhr catalyst under a pressure of about 1500 pounds per square inch and at a temperature of about 200° C.

EUCLID W. BOUSQUET.
WILBUR A. LAZIER.